United States Patent [19]

Mann

[11] Patent Number: 5,775,868
[45] Date of Patent: Jul. 7, 1998

[54] MOVABLE-DECK TRAILER

[76] Inventor: Fred W. Mann, Box 444, Waterville, Kans. 66548

[21] Appl. No.: 514,691

[22] Filed: Aug. 14, 1995

[51] Int. Cl.⁶ ............................................. B60P 1/04
[52] U.S. Cl. ...................... 414/475; 414/483; 414/477; 280/679
[58] Field of Search .................... 414/434, 435, 414/436, 469, 473, 474, 475, 476, 477, 478, 480, 482, 483, 484, 501, 563; 280/402, 679, 677, 684, 789, 763.1, 764.1, 186, 455.1

[56] References Cited

U.S. PATENT DOCUMENTS

| | | |
|---|---|---|
| 2,288,246 | 6/1942 | Kuester. |
| 2,487,325 | 11/1949 | Foster. |
| 2,717,707 | 9/1955 | Martin. |
| 2,789,714 | 4/1957 | Norris. |
| 3,061,124 | 10/1962 | Schueller ............................. 414/483 |
| 3,071,267 | 1/1963 | Bunch. |
| 3,159,294 | 12/1964 | Forsythe, Jr. |
| 3,214,047 | 10/1965 | Moye. |
| 3,241,855 | 3/1966 | Kersey et al. |
| 3,335,887 | 8/1967 | Snook. |
| 3,472,406 | 10/1969 | Slipp. |
| 3,550,801 | 12/1970 | Larson et al. |
| 3,624,786 | 11/1971 | Lundahl ............................. 414/475 |
| 3,690,490 | 9/1972 | Hall ............................. 414/477 |
| 3,927,775 | 12/1975 | Graupmann. |
| 4,133,440 | 1/1979 | Heidrick, Jr. |
| 4,231,710 | 11/1980 | Landoll ............................. 414/475 |
| 4,243,353 | 1/1981 | Reed. |
| 4,318,657 | 3/1982 | Znidaric. |
| 4,806,061 | 2/1989 | Fenton ............................. 414/475 |
| 4,842,470 | 6/1989 | Hubbard. |
| 4,865,341 | 9/1989 | Hicks ............................. 414/475 X |
| 4,943,202 | 7/1990 | Galloway ............................. 414/484 X |
| 4,986,719 | 1/1991 | Galbreath. |
| 5,011,362 | 4/1991 | Pijanowski. |
| 5,051,053 | 9/1991 | Groeneweg ............................. 414/484 X |
| 5,092,623 | 3/1992 | Swanner. |
| 5,137,414 | 8/1992 | Sloan et al. |
| 5,211,413 | 5/1993 | Williams, Sr. et al. ............................. 414/475 X |
| 5,259,720 | 11/1993 | Lobner ............................. 414/483 |
| 5,263,807 | 11/1993 | Pijanowski. |
| 5,324,160 | 6/1994 | Smith. |

FOREIGN PATENT DOCUMENTS

| | | | |
|---|---|---|---|
| 4240371 | 6/1994 | Germany ............................. 414/477 |
| 8801783 | 2/1990 | Netherlands ............................. 414/475 |

Primary Examiner—Frank E. Werner
Attorney, Agent, or Firm—Litman, McMahon & Brown L.L.C.

[57] ABSTRACT

A movable-deck trailer is provided which includes a frame with front and back ends, a tongue assembly mounted on the frame front end and a deck mounted on top of the frame. A wheeled carriage is mounted on the frame between its front and back ends and includes a pair of walking beam assemblies adapted for pivoting with respect to the frame. Each walking beam assembly mounts multiple torque tube axle/suspension assemblies. The carriage is longitudinally movable with respect to the frame and deck. A multiple-vehicle, movable-deck trailer includes multiple deck portions, the rearmost being tiltable. A movable-deck trailer adapted for tilting under the influence of either gravity or hydraulic power includes a hydraulic piston-and-cylinder unit interconnecting a frame and a tongue assembly thereof. A movable-deck trailer with a deck adapted for raising to the height of a loading dock includes hydraulic cylinders for raising and lowering same with respect to a frame.

32 Claims, 9 Drawing Sheets

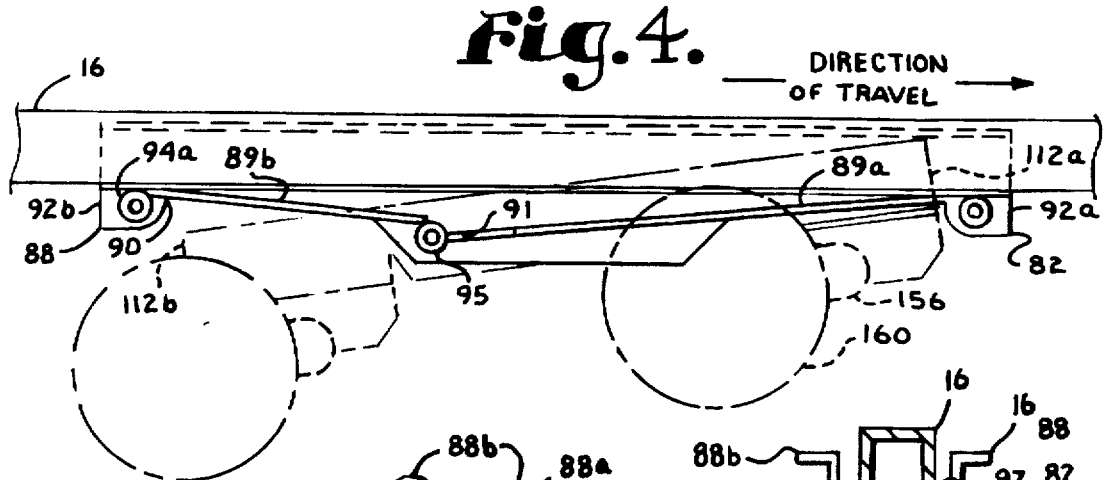
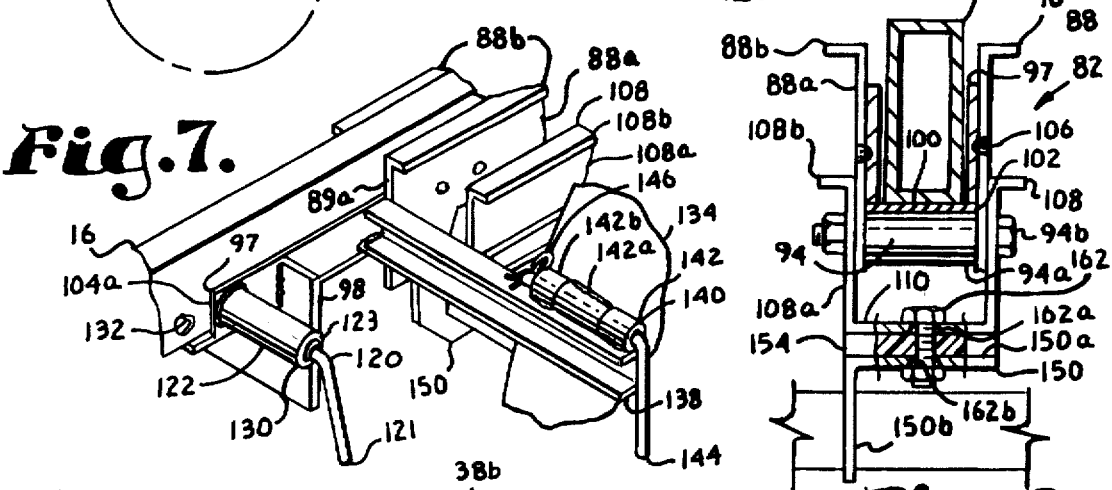
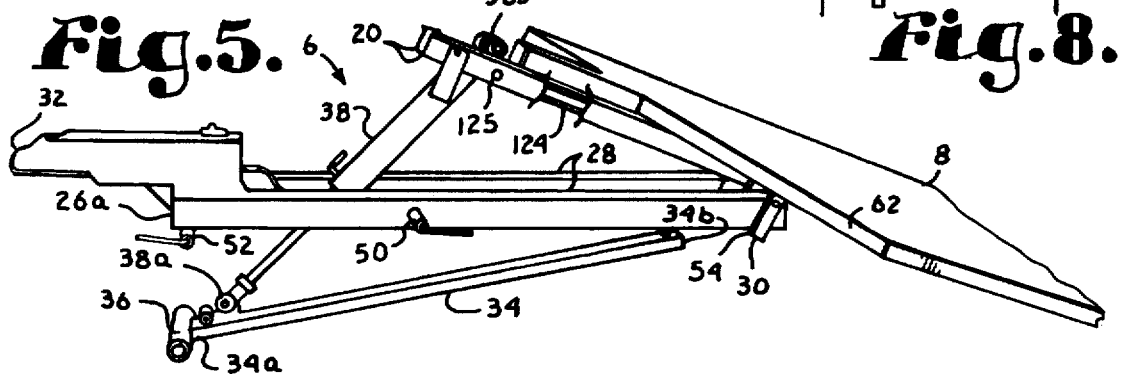
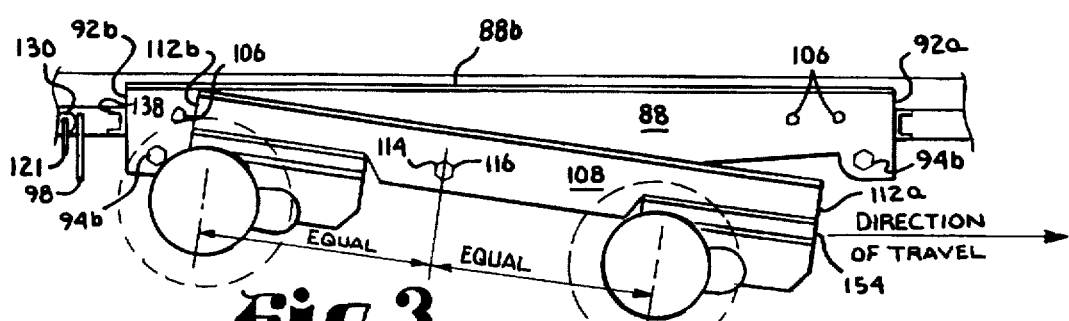

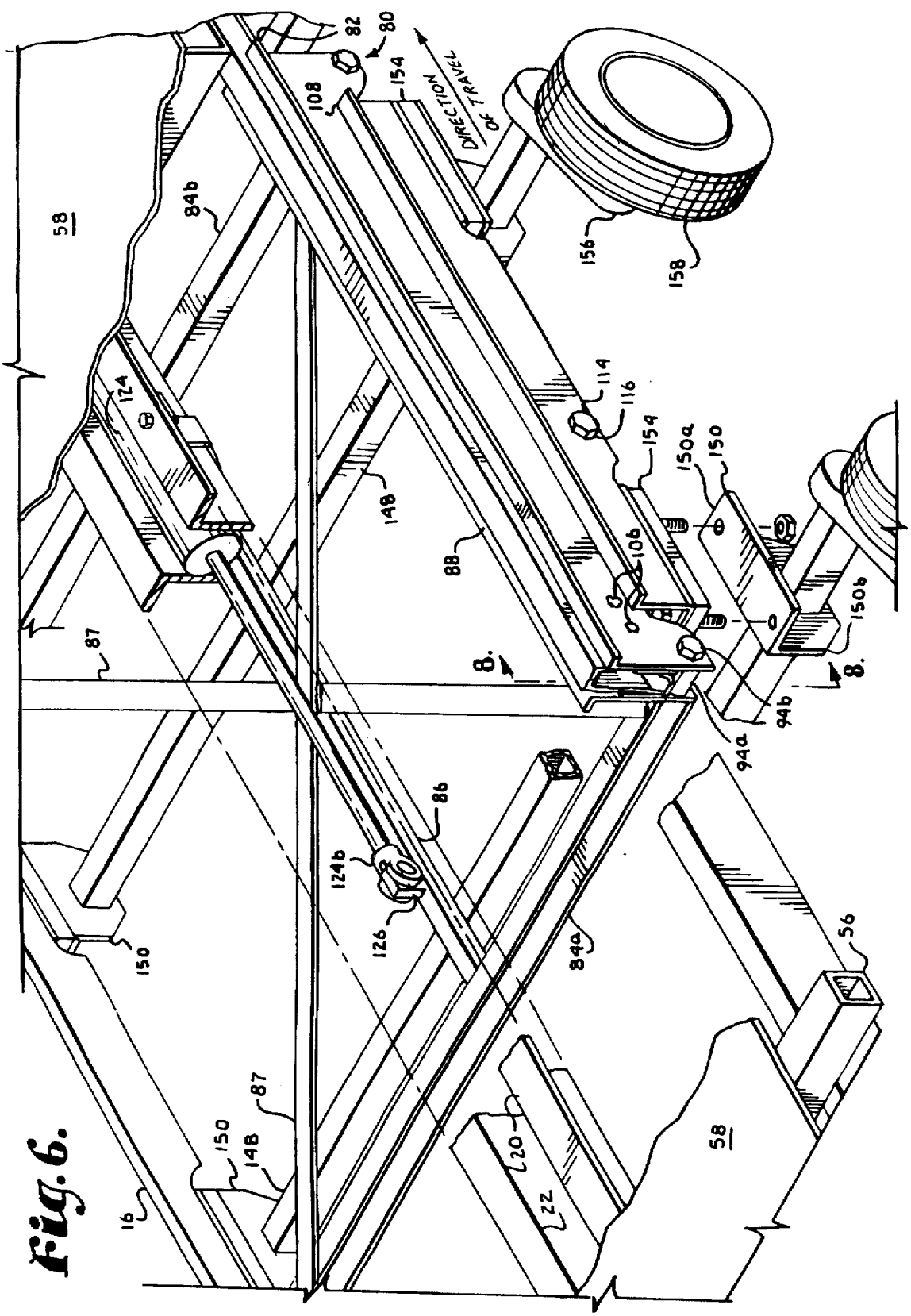

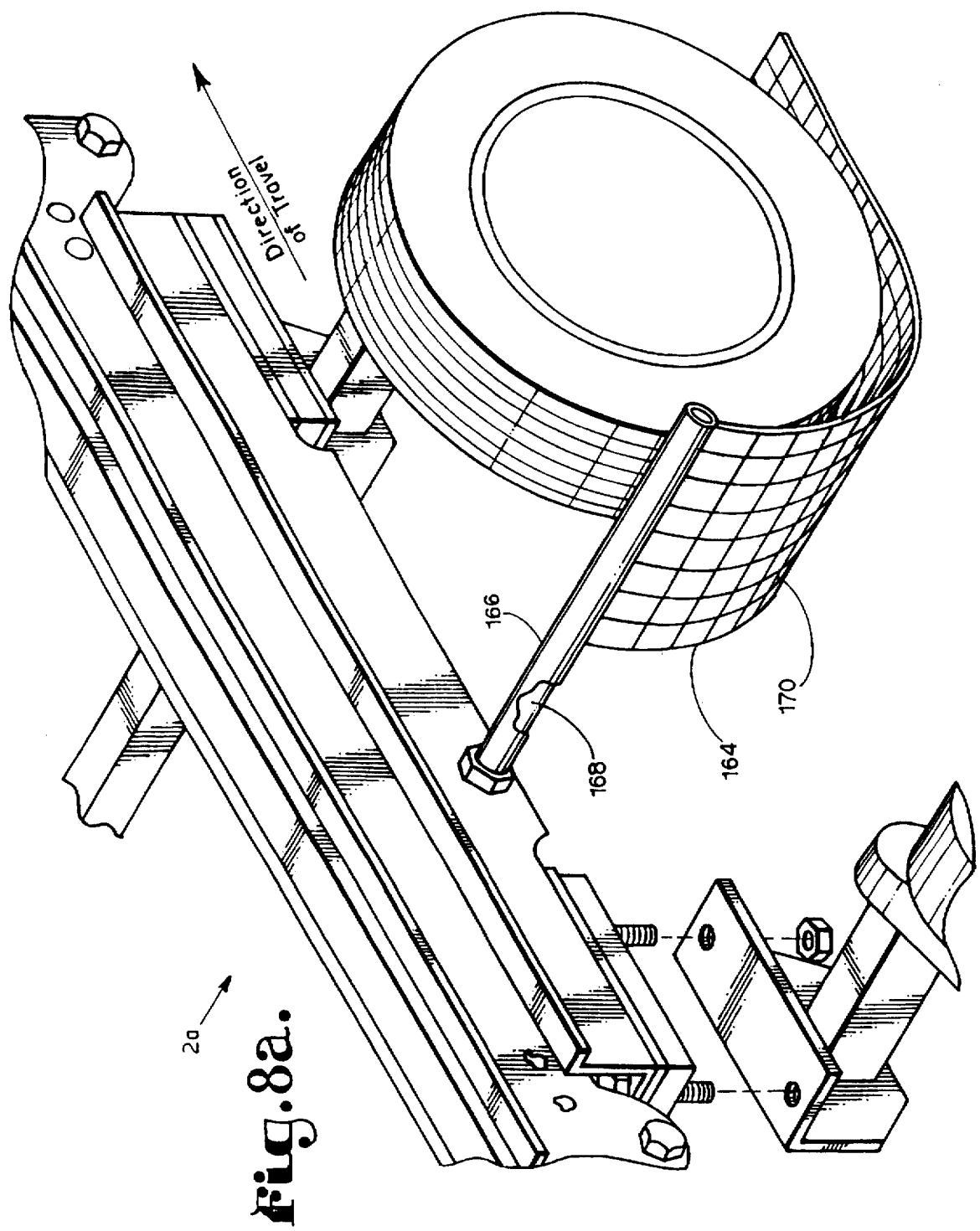

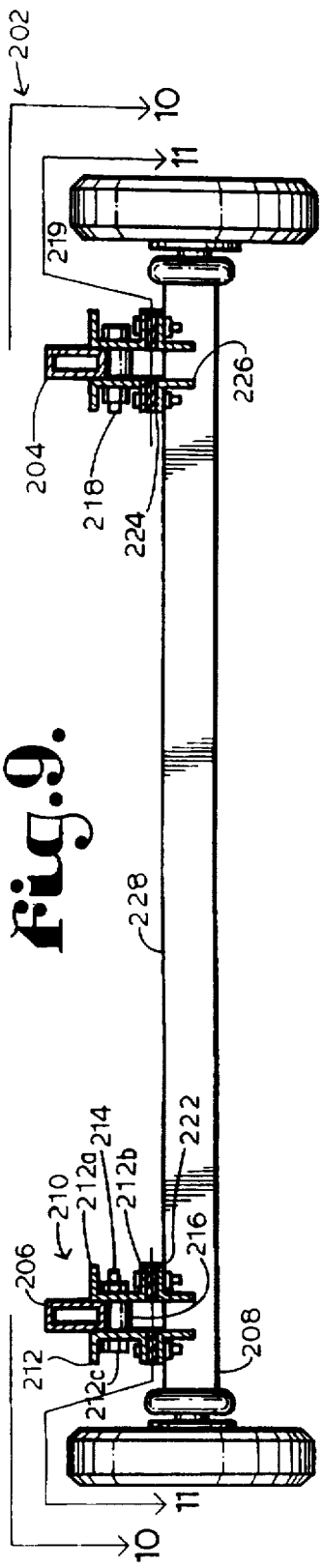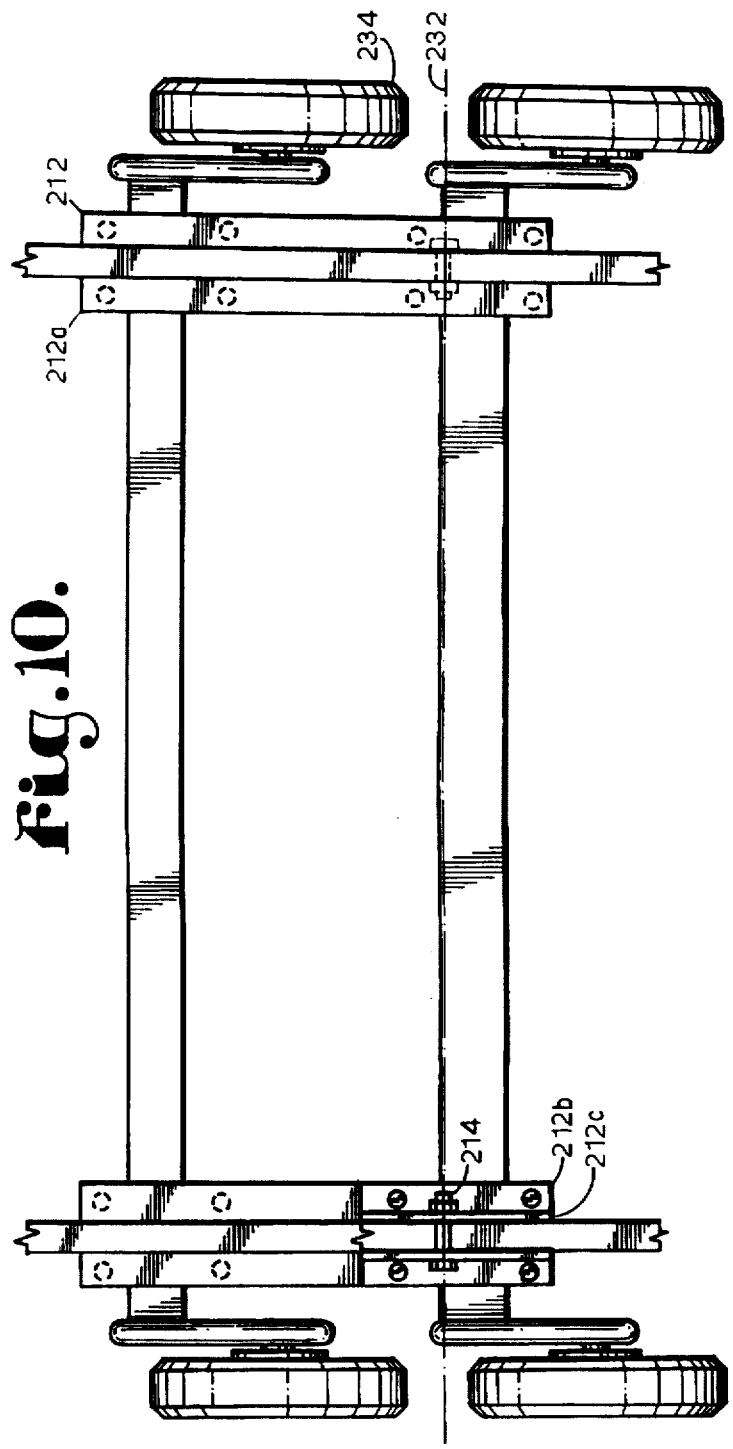

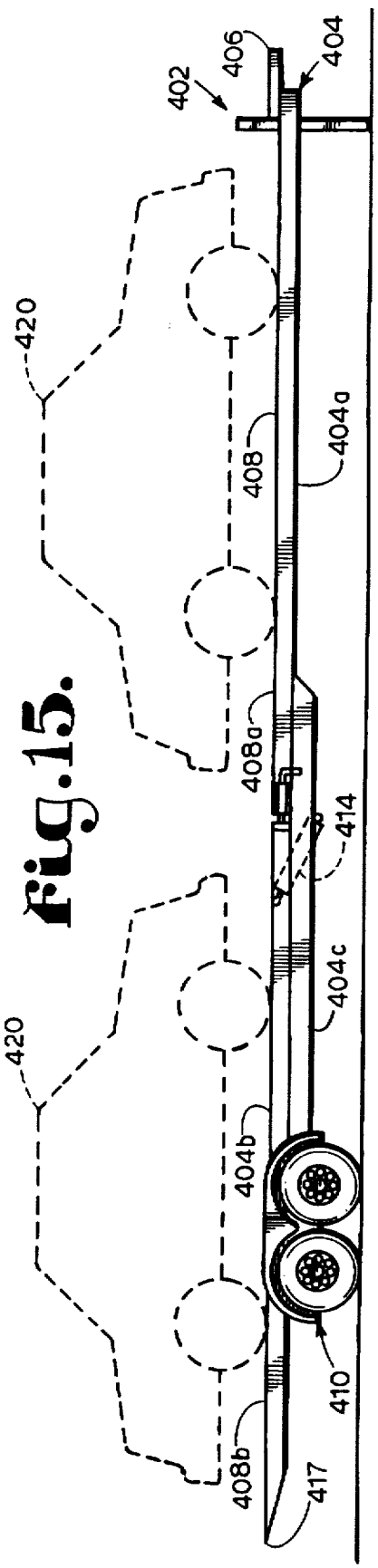
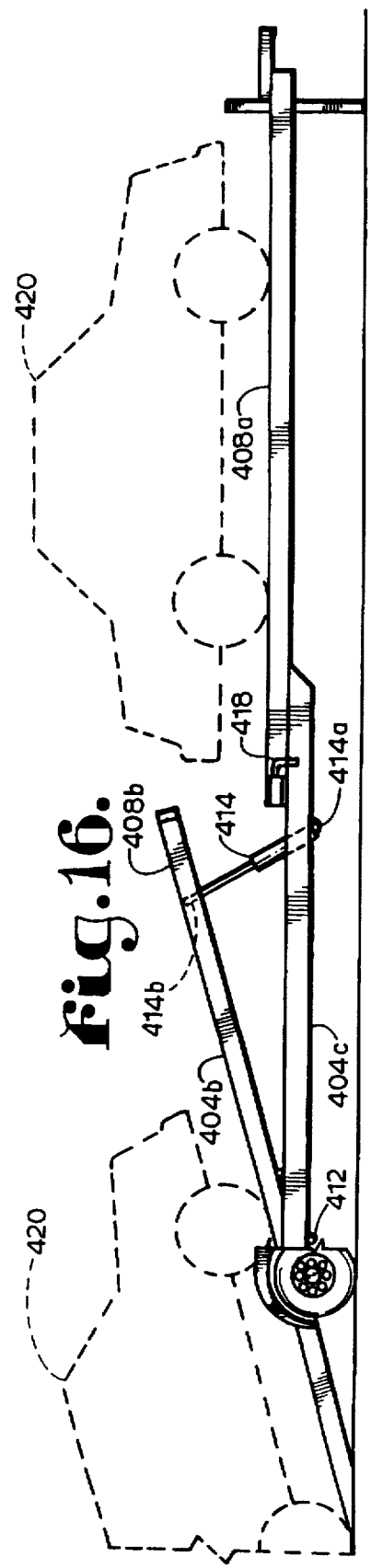

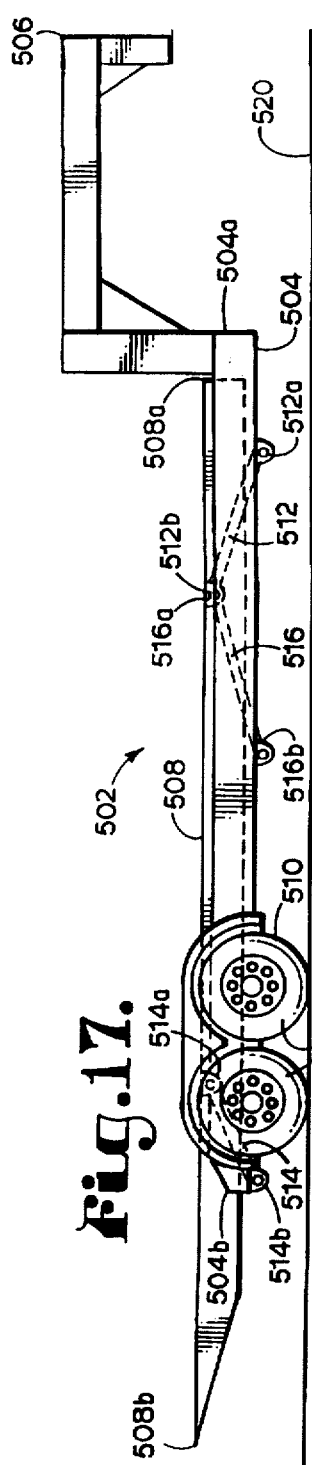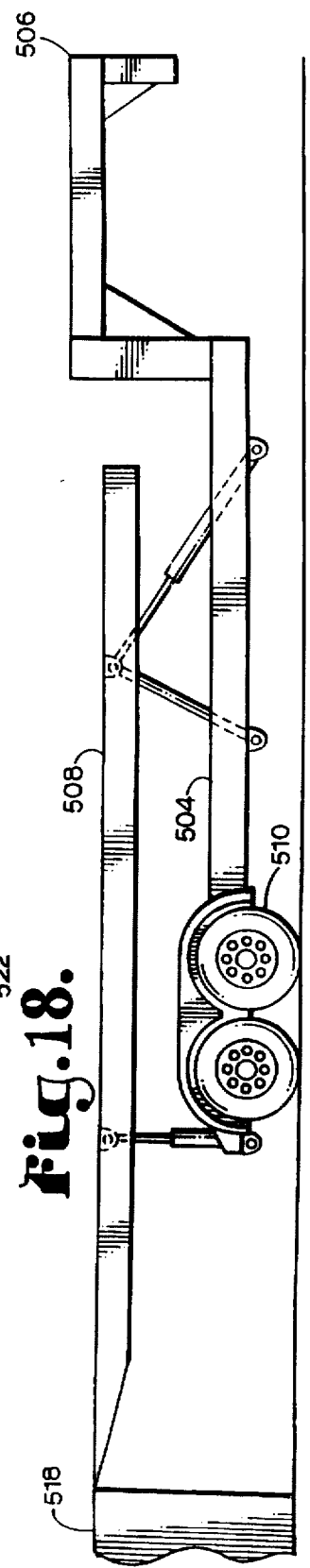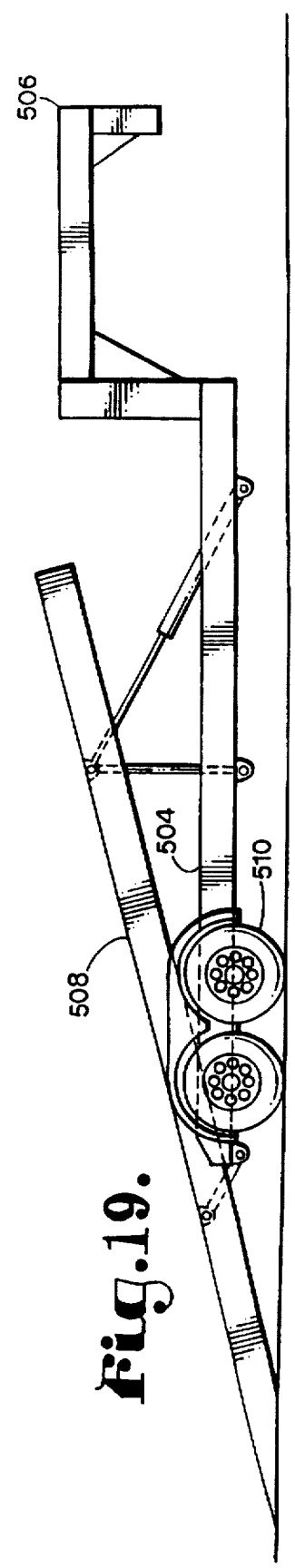

MOVABLE-DECK TRAILER

BACKGROUND OF THE INVENTION

1. Field of the Invention

The present invention relates generally to trailers, and in particular to trailers with movable decks or beds which facilitate loading and unloading of vehicles and other cargo items.

2. Description of the Related Art

A wide variety of vehicles have heretofore been devised for meeting the requirements of particular load-carrying applications. For cargo-carrying applications, vehicles are commonly provided with decks or beds for supporting the cargo in transit. However, cargo-carrying vehicle beds are often located at inconvenient heights for loading the cargo thereon. For example, in a transport configuration vehicle cargo beds are located a certain distance above a road surface and are generally oriented horizontally flat. However, the transport positions of vehicle cargo beds are often inconvenient for loading purposes. For example, the transport position heights of vehicle beds are often approximately level with the heights of loading docks and similar structures.

Vehicles are frequently transported on the beds of other vehicles. However, vehicles generally require lifting from the elevation of a paved surface to the elevation of the transport vehicle bed in order to provide for transportation of same. In spite of the loading and unloading problems which must be dealt with logistically, transportation of cargo vehicles on the beds of other vehicles is often the preferred way to transport vehicles. For example, car carrier type trailers are often utilized in connection with semi-truck and trailer rigs for transporting multiple passenger cars and light trucks for relatively long distances, e.g., for delivery of new vehicles from factories to dealers.

Even for relatively short trips, placing a cargo vehicle on a transport vehicle bed has advantages over previous methods, such as towing a vehicle by elevating the front end thereof. Tow trucks which are used for such towing operations generally have the disadvantage of being dependent upon the towed vehicle rear wheels being freely rotatable. In the event they are locked or the towed vehicle remains in gear so as to block the rotation of the rear wheels, towing a vehicle without damaging same can be difficult.

Also, difficulties can arise in connection with gaining access to locked vehicles for purposes of releasing parking brakes and placing their transmissions in neutral.

Yet another disadvantage with conventional tow truck operations relates to their limited ability to tow vehicles which have been damaged in accidents and the like. Transport vehicles with flatbeds adapted for carrying other vehicles tend to avoid such problems since the roadworthiness of the vehicle being transported is not a factor with transport vehicles having elevated decks or beds. Thus, bed-type transport vehicles are often preferred over conventional tow trucks, even for relatively short travel distances.

In order to fulfill this demand, trucks are available which include integral flatbeds which can be tilted to form a ramp whereby vehicles being transported can be either driven or winched onto the sloping bed from a ground surface, whereafter the bed can be rotated to a generally horizontal travel configuration. However, such trucks tend to be relatively expensive and somewhat limited in their usefulness due to the relatively specialized nature of their construction. Therefore, a need exists for a lower-priced vehicle capable of transporting loads such as vehicles on a folding bed thereof.

In view of the relatively high cost of a special-purpose, tilting-bed truck, similar advantages can be obtained with a trailer. Moreover, trailers often have the advantage of being less expensive and adaptable for use with tow vehicles such as pickup trucks, tractor rigs and even passenger automobiles. For occasional use, trailers provide many advantages and facilitate transport operations which would be difficult or impractical with a tow vehicle alone.

In order to address some of the criteria referred to above, trailers have been provided with tilting beds. An example of such a trailer is shown in the Foster U.S. Pat. No. 2,487,325. Another type of trailer with a tilting platform is shown in the Martin U.S. Pat. No. 2,717,707 and includes a wheeled carriage which is longitudinally translatable along the trailer bed.

However, such previous trailers have tended to be relatively complex, expensive, limited in usefulness and otherwise lacking in one or more desirable features. The present invention addresses some or all of the problems referred to above with previous transport vehicle designs.

SUMMARY OF THE INVENTION

A movable-deck trailer is provided which includes a frame, a tongue assembly mounted on a front end of the frame and a deck mounted on top of the frame. A wheeled carriage is movably mounted on the frame and adapted for pivotable movement with respect thereto whereby the frame and deck can be tilted between a generally horizontal transport configuration and a sloping load configuration. The carriage includes a pair of walking beams with front and back ends whereat a pair of torque tube axle/suspension assemblies are mounted. The wheeled carriage can be longitudinally translated along the frame by a hydraulic piston-and-cylinder unit, or by the tow vehicle with the carriage immobilized to effect relative sliding with the frame and deck. The tongue assembly includes a jack strut with a jack strut piston-and-cylinder unit adapted for raising the trailer front end and lowering the trailer back end to a tilted, load configuration and further adapted for returning it to a generally horizontal transport configuration. The carriage includes a pair of walking beam assemblies which pivot with respect to the trailer frame and mount torque tube axle/suspension assemblies. A movable-deck trailer for transporting multiple vehicles is also disclosed. A movable-deck trailer for loading and unloading to and from a loading dock is further provided and includes a deck which can be raised and lowered hydraulically.

OBJECTS AND ADVANTAGES OF THE INVENTION

The principle objects and advantages of the present invention include: providing a movable-deck trailer; providing such a trailer which facilitates transporting various objects; providing such a trailer which is adapted for loading vehicles thereon; providing such a trailer which facilitates driving a cargo vehicle thereon; providing such a trailer which provides for tilting of its deck; providing such a trailer which includes a carriage longitudinally movable on the trailer frame; providing such a trailer which is adapted for transporting multiple vehicles thereon; providing such a trailer which facilitates adjusting the tongue weight thereof; providing such a trailer which is adapted for providing a relatively low slope of its deck in order to facilitate driving or winching a cargo vehicle thereon; providing such a trailer which is adapted for transporting multiple vehicles; providing such a trailer which can accommodate a variety of hitch arrangements to a tow vehicle; providing such a trailer which can accommodate dock-high loading and unloading applications; providing such a trailer with bed movements accomplished by powered-hydraulics, manually-powered hydraulics, gravity tilt and electric motor driven actuators; providing such a trailer which can be reconfigured by the tow vehicle; providing such a trailer which is economical to manufacture, efficient in operation, capable of a long operating life and particularly well adapted for the proposed usage thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 3 is a fragmentary, side elevational view thereof showing a wheeled carriage thereof tilted in one direction.

FIG. 4 is a vertical, cross-sectional view thereof showing the wheeled carriage tilted in the other direction.

FIG. 5 is an enlarged, fragmentary, perspective view of the trailer, particularly showing a tongue assembly thereof.

FIG. 6 is an enlarged, fragmentary, perspective view thereof particularly showing the wheeled carriage.

FIG. 7 is an enlarged, fragmentary, perspective view thereof particularly showing a front portion of the wheeled carriage.

FIG. 8 is an enlarged, fragmentary, vertical cross-sectional view thereof taken generally along line 8—8 in FIG. 6.

FIG. 8a is an enlarged, fragmentary, perspective view of a trailer comprising a first modified embodiment of the present invention with a belt for immobilizing a wheel thereof.

FIG. 9 is a vertical cross-sectional view of a trailer embodying a second modified or alternative embodiment of the present invention.

FIG. 10 is a top plan view of a frame and wheeled carriage thereof taken generally along line 10—10 in FIG. 9.

FIG. 15 is a side elevational view of a trailer comprising a fourth alternative embodiment of the present invention, shown in a generally horizontal transport configuration thereof.

FIG. 16 is a side elevational view thereof with a deck back portion shown in a tilted load configuration.

FIG. 17 is a side elevational view of a trailer comprising a fifth modified embodiment of the present invention, shown in a travel configuration.

FIG. 18 is a side elevational view thereof, shown adjacent to a loading dock in a loading configuration with a deck thereof level.

FIG. 19 is a side elevational view thereof, shown in a configuration for loading from or unloading to a ground surface with the deck in a tilted, sloping position.

DETAILED DESCRIPTION OF THE PREFERRED EMBODIMENTS

I. Introduction and Environment

Figure 1:
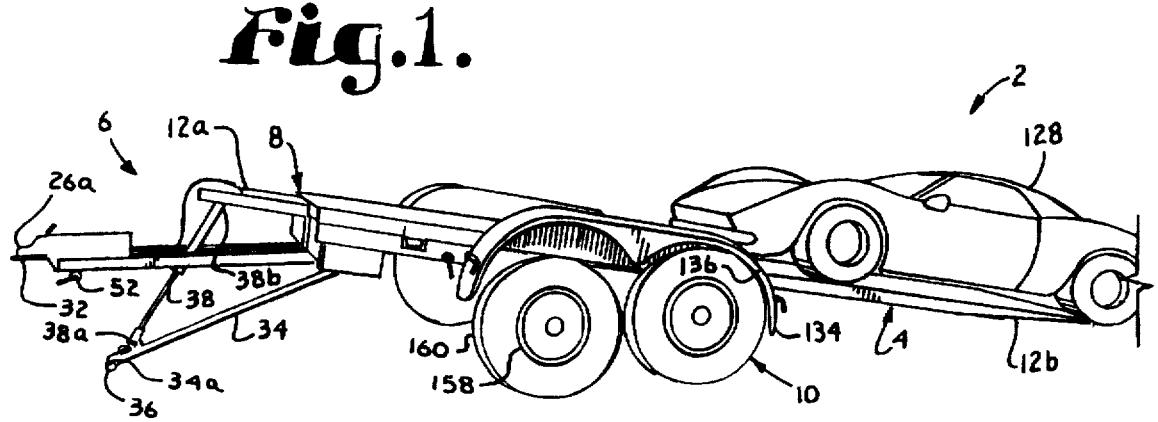
FIG. 1 is a perspective view of a movable-deck trailer embodying the present invention.
Figure 2:
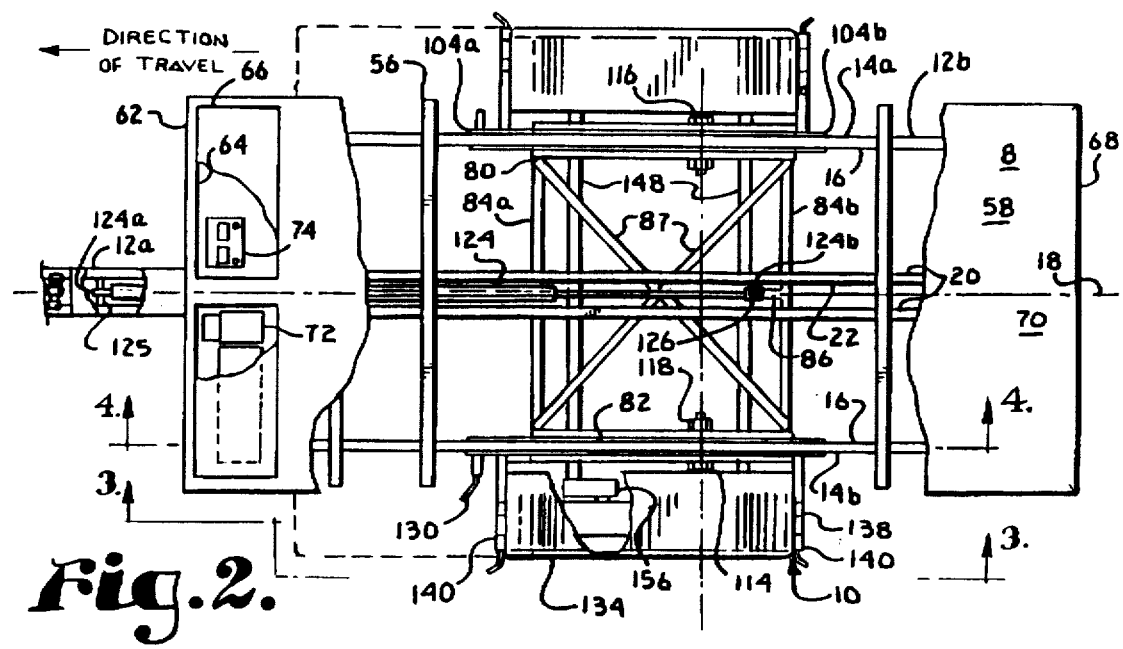
FIG. 2 is a fragmentary, top plan view thereof with portions broken away to reveal internal construction.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Certain terminology will be used in the following description for convenience in reference only and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the embodiment being described and designated parts thereof. Said terminology will include the words specifically mentioned, derivatives thereof and words of a similar import.

Referring to the drawings in more detail, reference numeral 2 generally designates a movable-bed trailer embodying the present invention. The trailer 2 generally comprises a frame 4, a tongue assembly 6 mounted on the frame 4, a deck 8 mounted on top of the frame 4 and a carriage 10 mounted on the frame 4. The trailer 2 is adapted for towing by a suitable tow vehicle (not shown).

II. Frame 4

The frame 4 includes front and back ends 12a, 12b and opposite sides 14a, 14b. A pair of frame longitudinal members 16 extend longitudinally along the frame sides 14a, 14b respectively and each is generally parallel to a trailer longitudinal axis 18, which extends generally in alignment with a normal direction of travel for the trailer 2. The longitudinal members 16 can comprise, for example, hollow, tubular box beams with generally rectangular cross-sectional configurations. A pair of angle-section members 20 extend longitudinally for the length of the trailer 2 in closely-spaced proximity to the longitudinal axis 18 and form a central passage 22 therebetween.

III. Tongue Assembly 6

The tongue assembly 6 includes front and back ends 26a, 26b and a pair of tongue members 28 which can comprise, for example, hollow, tubular box beams with generally rectangular cross-sectional configurations.

A tongue hinge assembly 30 is mounted on the tongue members 28 at the tongue assembly back end 26b. The tongue hinge assembly 30 pivotally mounts the tongue assembly 6 on the frame angle section members 20 for movement between an elevated, retracted position generally aligned with the angle section members 20 and a lowered, extended position (FIGS. 1 and 5) with the deck 8 tilted to a front-to-rear downwardly sloping configuration and the tongue assembly 6 sloping downwardly from back-to-front. The tongue assembly front end 26a mounts a hitch 32 which can comprise, for example, a ball-type hitch for attachment to a corresponding bumper type hitch mounted on the tow vehicle (not shown).

Although a ball-type trailer hitch 32 is shown, various other types of hitches could be successfully employed with the trailer of the present invention, including fifth-wheel, king pin and pintle types of hitches.

A jack strut 34 includes a back end 34b pivotally connected to the tongue members 28 in spaced relation forwardly from the tongue back end 26b and a jack strut front end 34a terminating at a tubular pipe foot 36. A jack strut piston-and-cylinder unit 38 includes a back end 38a connected to the trailer tongue members 28 and a front end 38a pivotally connected to the jack strut 34 at the jack strut front end 34a. The jack strut piston-and-cylinder unit 38 is movable between a retracted position with the jack strut retracted and an extended position with the jack strut extended (FIG. 5).

A tongue-to-frame lock 50 is provided for selectively locking the tongue members 28 to an angle section member 20. A jack strut lock 52 is provided for selectively locking the jack strut 34 to a tongue member 28 with the jack strut 34 in its retracted or raised position.

The tongue hinge assembly 30 includes a plurality of hanger straps 54 depending downwardly from the frame 4 and pivotally connecting the tongue members 28 at the tongue assembly back end 26b.

IV. Deck 8

The deck 8 includes a plurality of tubular joists 56 extending in parallel, spaced relation transversely across the trailer frame 4 and mounted on top of the longitudinal members 16 and the angle section members 20. Flat plate steel decking 58 can be embossed with a suitable anti-slip pattern and is mounted on top of the tubular joists 56.

The deck 8 has a front end 62 mounting a pair of control compartments 64 under raisable lids 66 and a back end 68 which is beveled to form a sloping, tapered deck tail 70. The control compartments 64 can enclose suitable components of a hydraulic power system, such as a motorized hydraulic pump 72 and an electrical storage battery 74 for powering same.

V. Carriage 10

The carriage 10 includes a carriage subframe 80 consisting of a pair of walking beams 82 each associated and extending in parallel relation with respect to a respective longitudinal member 16, front and back C-channel crosspieces 84a, 84b, a carriage subframe longitudinal member 86 located approximately midway between the walking beams 82 and connected at opposite ends thereof to the front and back crosspieces 84a, 84b, and diagonal braces 87.

Each walking beam 82 includes a pair of angle-section roller plates 88 each having a generally vertical side panel 88a and a generally horizontal flange 88b projecting laterally therefrom. Each roller plate side panel 88a includes a pair of notches 90 which open downwardly and are positioned in proximity to front and back ends 92a, 92b thereof.

Each walking beam 82 includes a pair of rollers 94 rotatably mounted between the roller plates 88 in proximity to front and back ends 92a, 92b thereof. Each roller 94 includes a rotating sleeve 94a rotatably mounted on a suitable roller bolt 94b extending through the roller plates 88. Each walking beam 82 includes two pairs of guide plates 97, one pair each extending from the roller plate front and back ends 92a, 92b and welded (e.g., spot welded) to a respective roller plate. Each walking beam 82 includes a pair of guide plate U-brackets or gussets 98 which are connected to a respective pair of guide plates at the front and back of a respective walking beam 82 and extend under a respective longitudinal member 16. The guide plate brackets 98 maintain the respective pairs of guide plates 97 in substantially fixed, parallel relation.

Each longitudinal member 16 has a longitudinal member base plate 100 mounted thereon with opposite side edges 102 thereof projecting laterally outwardly from the sides of the longitudinal members 16 and further has front and back ends 104a, 104b extending at least to the travel limits of the rollers 94. The rollers 94 roll on the base plates 100, with the latter providing additional strength and stiffness for the longitudinal members 16. The walking beams 82 are retained on their respective longitudinal members 16 by the base plate side edges 102 being captured between respective rollers 94 and guide plates 97 whereby the carriage 10 is permitted to slide longitudinally with respect to the frame 4 while the carriage 10 is retained on the frame 4 and prevented from separating therefrom in the event the trailer 2 encounters a bump or some similar road condition which might otherwise cause the frame 4 and the deck 8 to be separated from the carriage 10.

The guide plates 97 can be fixedly attached to respective roller plates 88 by spot welds 106, which can be made after the trailer frame 4 is placed on the carriage 10 in its final position in the assembly process, whereafter the guide plates 97 can be inserted and welded in place with the spot welds 106.

Each pair of roller plates 88 is secured in parallel, spaced relation by front and back spacers 89a, 89b which can be welded in place between respective roller plate side panels 88a. The front spacer 89a includes a spacer opening 91 to facilitate the discharge of gravel, rocks, accumulated water, etc. to prevent same from being trapped and retained within the walking beams 82. A cylindrical pivot hub sleeve 95 extends between the roller plate side panels 88a.

Each walking beam 82 includes a pair of axle plates 108 each comprising a generally vertical side panel 108a and a generally longitudinal flange 108b projecting laterally therefrom.

Each pair of axle plates 108 is maintained in parallel, spaced relation by a respective pair of axle plate spacers 110 located in proximity to front and back ends 112a, 112b respectively of the axle plates 108. An axle bolt 114 extends through the axle plates 108 and through the pivot hub sleeve 95 whereby the axle plates 108 are pivotally mounted on the roller plates 88. The axle bolts 114 and roller bolts 94b for retaining the rollers 94 in place can be secured by suitable lock nuts 118. Examples of the walking beams 82 rocked from one way to the other about the axle assemblies 116 are shown in FIGS. 3 and 4. The pivot hub sleeves 95, axle bolts 114 and respective lock nuts 118 form axle assemblies 116.

The carriage 8 is reciprocated between its forward, loading position (FIG. 1) and its rearmost position by a carriage hydraulic piston-and-cylinder unit 124 with a front end 124a mounted on the frame 4 between the angle section members 20.

The carriage piston-and-cylinder unit 124 includes a front end 124a connected to the angle section members 20 by a transverse pin 125 and a back end 124b connected to the carriage subframe longitudinal member 86 by a tab 126.

Carriage locks 130 are mounted on the front guide plates 97 and can be similar in construction and operation to the other locks 50 and 52, each comprising a plunger 120 reciprocably positioned within a lock barrel or sleeve 122 and biased towards a locked position by a spring (not shown). The barrel outer ends 123 can be beveled whereby twisting a plunger handle 121 can place the lock plunger 120 in a retracted, unlocked position. By twisting the lock plunger handle 121, the spring biases the plunger 120 inwardly and into a respective lock receiver 132 for placing the lock 130 in its locked configuration.

A pair of fenders 134 each including two wheel wells 136 are removably mounted on channel-section outriggers 138 which project outwardly from the roller plates 88 at the ends of the respective walking beams 82. Each fender 134 is retained in place by a pair of fender locks 140 each including a fender locking pin 140 extending through aligned fender mounting tubes 142a, 142b which are attached to a respective outrigger 138 and to a respective fender 142b respectively. A fender locking pin 144 is selectively received in the fender mounting tubes 142a, 142b and is retained in place by a cotter pin 146.

The carriage 10 includes a pair of torque tube axle/suspension assemblies 148 which are attached (e.g., welded) to angle-section axle hangers 150 which are in turn bolted to respective axle plate spacers 110 by bolts 152 which extend through the axle plate spacers 110, resilient rubber shock pads 154 and mounting flanges 150a of the axle hangers 150, from which axle hanger plates 150b depend downwardly and mount the torque tubes 148. Each torque tube 148 includes a pair of trailing arms 156 extending rearwardly therefrom and mounting wheels 158 and tires 160. The mounting bolts 152 extend through axle hanger mounting bolt receivers 162a, 162b in the shock pads 154 and the axle hanger flanges 150b respectively. The receivers 162a, 162b are tapered or enlarged to accommodate a certain amount of flex and distortion in connection with the operation of the trailer 2. Thus, the resilient shock pads 154 have a shock-absorbing function in connection with the torque tube/trailing arm suspension of the trailer 2.

VI. Operation

In operation, the deck 8 is movable both pivotably and longitudinally. Longitudinal movement of the carriage 10 relative to the rest of the trailer 2 is accomplished by means of the longitudinal piston-and-cylinder unit 124. Full retraction of the carriage piston-and-cylinder unit 124 places the trailer 2 in a load configuration as shown in FIG. 1 whereby the lowest slope of the deck 8 can be obtained for convenient loading of a load 128 such as a vehicle. Naturally, lower slopes of the deck 8 tend to make vehicle loading easier since the vehicle 128 has a less steep incline or grade to negotiate.

The jack strut piston-and-cylinder unit 38 is extended to place the trailer 2 in its load configuration, which has the effect of raising the frame front end 12a. The jack strut 34 can be used independently of movement of the carriage 10 whereby the frame front end 12a can be raised and lowered. By releasing the frame 4 from the tongue assembly 6 by means of the tongue-to-frame lock 50, the hitch 32 can remain connected to a ball hitch mounted on a tow vehicle whereby the trailer 2 can be tilted without having to disconnect it from a tow vehicle.

The carriage 10 can be selectively locked in place with respect to the frame 4 by means of the carriage locks 130.

As an alternative to the carriage piston-and-cylinder unit 124, the wheels can be locked (e.g., by means of brakes, shocks, etc.) and the tow vehicle used to position the frame 4 with respect to the carriage 10. The longitudinal members 16 can be provided with multiple lock pin receivers 132 for locking the carriage 10 at various locations therealong.

VII. First Modified Embodiment Trailer 2a

A trailer comprising a first modified or alternative embodiment of the present invention is shown in FIG. 8a and is generally designated by the reference numeral 2a. The trailer 2a can be substantially similar to the trailer 2 except that the carriage piston-and-cylinder unit 124 for longitudinally reciprocating the carriage 10 can be replaced by a pair of wheel immobilizing belt assemblies 164 each comprising a hollow tubular sleeve 166 adapted for placement over an extension 168 of a respective axle bolt 114, such extension protruding laterally outwardly from the walking beams 82. Each belt assembly 164 also includes a length of flexible metal belting 170, which can comprise a type commonly used in trailers for dispensing fertilizer and the like in an endless-belt conveyor type application. The belting 170 includes multiple, hingedly interconnected metal segments and is fixedly attached at one end to the sleeve 166 and allowed to rest on the ground surface between the tires 160. The belt assemblies 164 are adapted for immobilizing the wheels 158 by placing the belting 170 under the rear wheels 158 when it is desired to slide the carriage 10 rearwardly with respect to the frame 4 and under the front tires 160 when it is desired to slide the carriage 10 forwardly with respect to the frame 4. With a pair of the tires 160 thus immobilized, and the carriage locks 130 unlocked, the belting 170 immobilizes the carriage 10 whereby the rest of the trailer 2 can be longitudinally translated with respect thereto by means of the tow vehicle.

VIII. Second Modified Embodiment Trailer 202

Figure 11:
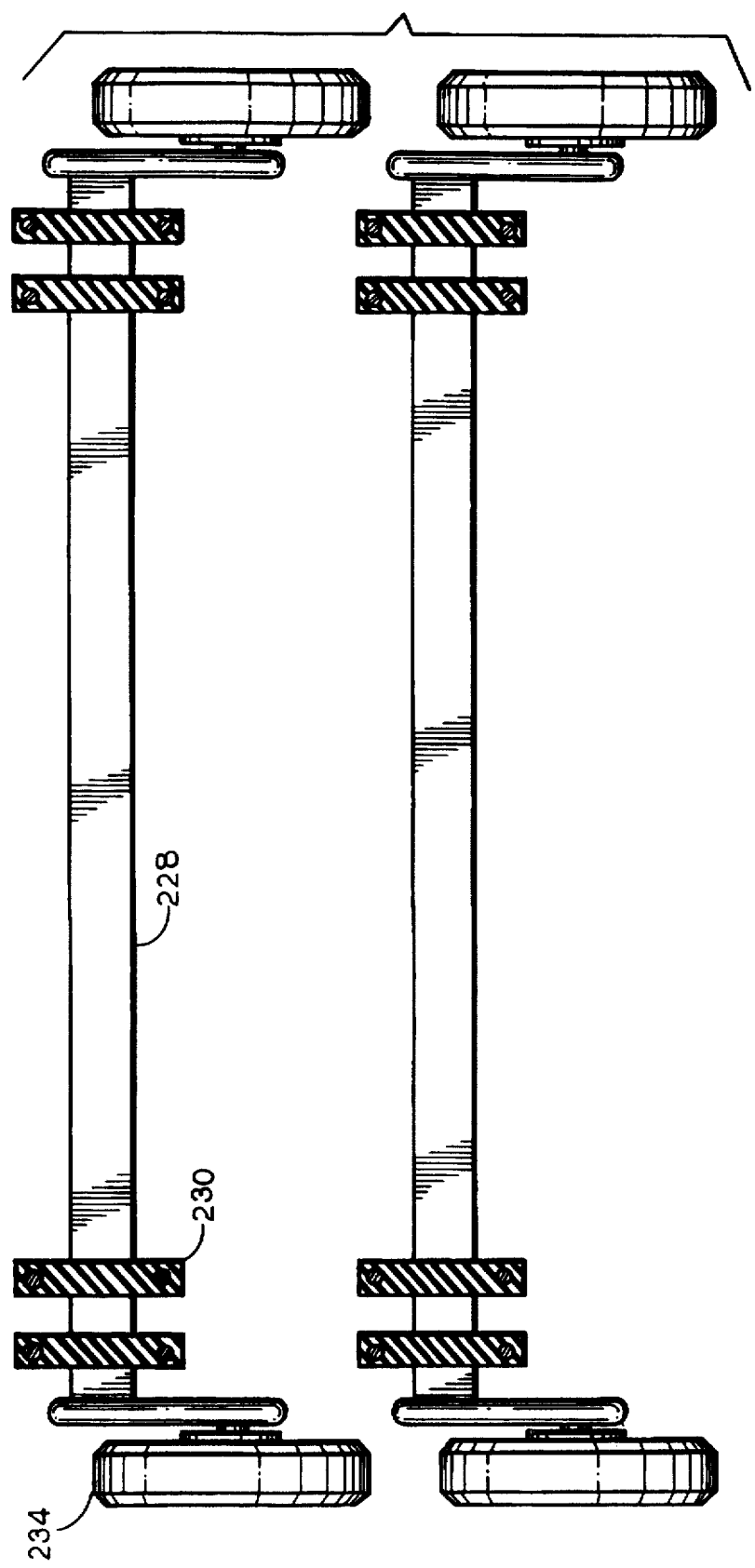
FIG. 11 is a horizontal cross-sectional view thereof taken generally along line 11—11 in FIG. 9.

A movable-bed trailer comprising a second modified or alternative embodiment of the present invention is shown in FIGS. 9–11 and is generally designated by the reference numeral 202. The trailer 202 includes a frame 204 of which a pair of tubular, box beam longitudinal members 206 are shown. A carriage 208 includes a pair of walking beams 210, each comprising a pair of C-channel section axle plates 212. The axle plates 212 are interconnected by a walking beam axle assembly 214 including a sleeve 216 fixedly attached, e.g., welded, to a respective longitudinal member 206 and rotatably receiving a respective axle bolt 218 which extends through the axle assembly 214 concentrically with the sleeve 216 and mounts on an axle lock nut 219.

Alternatively, the axle assemblies 214 can be extended through the longitudinal members 206 for pivotal connection thereto.

Each axle plate 212 comprises a C-channel section with generally horizontal upper and lower flanges 212a, 212b and a generally vertical web 212c. Two pairs of angle-section axle hangers 222 are mounted in spaced front-and-back relationship on respective axle plate lower flanges 212b of each walking beam and are comprised of generally horizontal flanges 224 and generally vertical plates 226, the latter being fixedly attached, e.g., welded, to a respective torque tube 228. Resilient shock pads 230 are positioned between each hanger flange 224 and a respective axle plate lower flange 212b. Hanger mounting bolts 232 extend through respective enlarged or elongated hanger bracket receivers 230 and are retained in place by lock nuts 234.

A pivotal axis 232 of the carriage extends transversely across the trailer 202 through the axle assemblies 214 and is located approximately equidistant from rotational axes of the wheels.

The carriage 208 of the trailer 202 functions in a substantially similar manner to the carriage 10 of the trailer 2 whereby the walking beams 210 are adapted to pivot with respect to the frame 204 and thus react to various surface and road conditions, as well as loading conditions for loads placed on the trailer 202.

IX. Third Modified or Alternative Embodiment Movable-Bed Trailer 302

Figure 12:
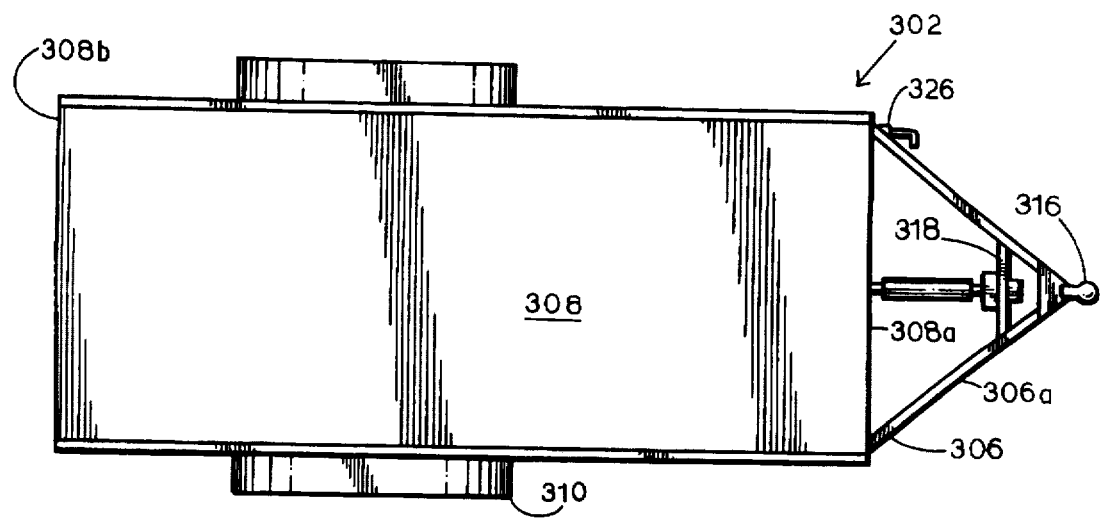
FIG. 12 is a top plan view of a trailer comprising a third modified embodiment of the present invention.
Figure 13:
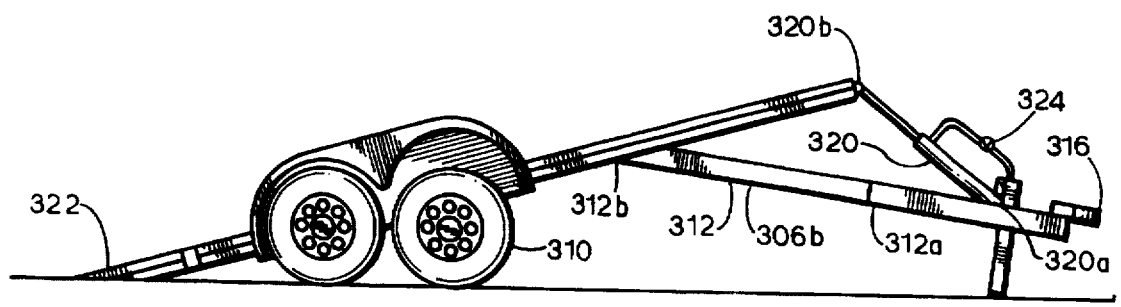
FIG. 13 is a side elevational view thereof with the trailer in a generally horizontal transport configuration.
Figure 14:
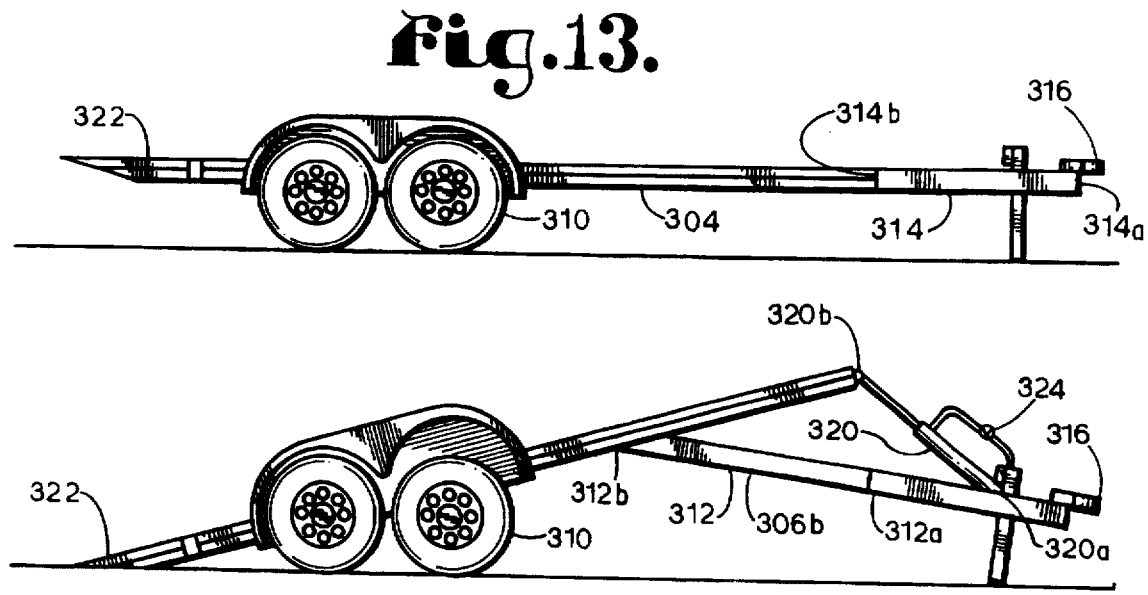
FIG. 14 is a side elevational view thereof with the trailer in a tilted load configuration.

A third modified or alternative embodiment of the movable-bed trailer embodying the present invention is shown in FIGS. 12–14 and is generally designated by the reference numeral 302. The trailer 302 includes a frame 304, a tongue assembly 306 connected to the frame 304 and extending forwardly therefrom, a deck 308 mounted on top of the frame 304 and a carriage 310 pivotably mounted on the frame 304. The carriage 310 can include walking beams and torque tube axles of the types described previously.

The tongue assembly 306 includes an A-frame front portion 306a and a back portion 306b including a pair of tongue back portion members 312 extending in generally parallel, spaced relation. The tongue back portion members 312 include front and back ends 312a, 312b respectively, the latter being pivotably connected to the frame 304. A pair of tongue front portion members 314 include respective front ends 314a which converge at a trailer hitch 316 and back ends 314b attached to the tongue back portion member front ends 312a. The tongue front portion 306a includes a crosspiece 318 extending between the tongue front portion members 314.

A hydraulic piston-and-cylinder unit 320 includes a front end 320a mounted on the crosspiece 318 and a back end 320b connected to a front end 308a of the deck 308. The deck 308 also includes a tapered, sloping tail section 322 at a deck back end 308b which facilitates vehicle loading from a flat surface. The hydraulic piston-and-cylinder unit 320 can be provided with a check valve 324 adapted for one-way hydraulic fluid flow whereby the unit 320 can be maintained in an extended position thereof (FIG. 14).

A deck latch or lock 326 is provided for selectively locking the frame 304 to the tongue 306, and can be similar to the locks 50, 52 described above.

In operation, the trailer 302 can be moved from a normal travel or transport position (FIG. 13) with the deck 308 substantially level to a load configuration (FIG. 14) with the deck 308 sloping downwardly from front-to-back and adapted to receive a vehicle driven onto its back end 308b. Moving from a transport configuration to a load configuration can be accomplished by releasing the deck latch 326 and applying weight to the deck tail section 322, e.g., by a person standing thereon. The hydraulic piston-and-cylinder unit 320 will extend gradually, thus controlling the rotation of the deck 308 whereby its tail section 322 will slowly lower.

The check valve 324 cooperates with the hydraulic piston-and-cylinder unit 320 to maintain the trailer 302 in its load configuration until the check valve 324 is released, which will allow the trailer 302 to resume its transport configuration under the gravitational force of a load (e.g., a vehicle) on its deck 308. Alternatively, the piston-and-cylinder unit 320 can be connected to a hydraulic power source for power reciprocation of same.

X. Fourth Modified Embodiment Movable-Bed Trailer 402

A movable-bed trailer 402 comprising a fourth modified or alternative embodiment of the present invention is shown in FIG. 15 and generally comprises a frame 404 having a tongue assembly 406 mounted thereon and extending forwardly therefrom for connection to a tow vehicle (not shown). A deck 408 is mounted on top of the frame 404. A carriage 410 is pivotably mounted on the frame 404 and can comprise, for example, a walking beam type carriage such as the carriage 310 described above.

The frame 404 includes a front frame 404a, a back frame 404b and a subframe 404c. The front frame 404a is fixedly mounted on the subframe 404c at a hinge assembly 412. The carriage 410 is also pivotably mounted on the subframe 404c. A hydraulic piston-and-cylinder unit 414 includes a front end 414a connected to the subframe 404c and a back end 414b connected to the back frame 404b and is adapted for raising the front frame 404a to a load position as shown in FIG. 16 and for lowering same to a travel or transport position as shown in FIG. 15 with the front and back frames 404a, 404b substantially horizontally aligned in coplanar relationship. The deck 408 includes front and back decks 408a and 408b mounted on the front and back frames 404a, 404b respectively. The back frame 404b can be tilted from its transport configuration to its load configuration by a person standing on a tapered tail section 417 thereof. Moreover, power tilt means can be employed such as a hydraulic pump, either manually or power-actuated, or an electric jack.

The piston-and-cylinder unit 414 can be provided with a check valve such as the piston-and-cylinder unit 320 described above.

A deck latch or lock 418 can be provided for releasably locking the front frame 404a to the subframe 404c.

The trailer 402 is adapted for transporting two vehicles 420 as shown, with the back frame 404b tilted to a load configuration as shown, whereafter a vehicle 420 can be moved to the deck front 408a and another vehicle loaded on the deck back 408b by tilting the back frame 404b back to a load configuration.

Although a trailer 402 is shown with deck portions for transporting two vehicles, the trailer could be extended to any practical and/or legal length for transporting three or more vehicles, utilizing the rearmost thereof for loading the vehicles in turn. As with the trailer 302 described above, the piston-and-cylinder unit 414 of the trailer 402 can be either unpowered or powered (e.g., manually or with a suitable power-driven pump), and can be replaced with an electric extensible jack member.

XI. Fifth Alternative Embodiment Movable-Bed Trailer 502

A movable-bed trailer comprising a fifth modified or alternative embodiment of the present invention is shown in FIGS. 17–19 and is generally designated by the reference numeral 502. The trailer 502 includes a frame 504 with front and back ends 504a, 504b, a gooseneck-type tongue assembly 506, a deck or bed 508 and a wheeled carriage 510 which can comprise, for example, a walking beam carriage of the type described above.

The deck 508 includes front and back ends 508a, 508b and is movable between a transport position (FIG. 17), a dock-high position (FIG. 18) substantially level with a loading dock 518 for loading therefrom or unloading thereto, and a tilted position sloping downwardly from front-to-rear for loading from or unloading to a ground surface 520.

Movement of the deck 508 is accomplished by means of a front piston-and-cylinder unit 512 with a frame end 512a attached to the frame 504 in proximity to its front end 504a and a deck end 512b attached to the deck 508 in proximity to its front end 508a, and by a back piston-and-cylinder unit 514 with a frame end 514 attached to the frame 504 in proximity to its back end 504b and a deck end 514b attached to the deck 508 in proximity to its back end 508b. A link arm 516 includes a frame end 516a attached to the frame 504 in spaced relation rearwardly of the front piston-and-cylinder unit frame end 512a and in spaced relation forwardly of the carriage 510.

In a transport configuration (FIG. 17), the piston-and-cylinder units 512, 514 are retracted, and the link arm 516 is swung to its full forward position whereby the deck 508 is located partly within the frame 504. Extending both the piston-and-cylinder units 512, 514 raises the deck 508 to its dock-high position as shown in FIG. 18, and swings the link arm deck end 516b upwardly and rearwardly (i.e., counterclockwise as shown in FIG. 18) whereby the deck 508 is substantially level.

With the front piston-and-cylinder unit 512 fully extended and the back piston-and-cylinder unit 514 retracted (FIG. 19), the link arm 516 is fully extended to a substantially vertical position and the deck 508 slopes downwardly from front-to-back.

It will be appreciated that by providing independently selective controls for the front and back piston-and-cylinder units 512, 514, a wide variety of positions can be provided for the deck 508, and various loading/unloading conditions accommodated. Moreover, the geometries of the piston-and-cylinder units 512, 514 and the link arm 516 can be varied to provide desired configurations of the deck 508 with respect to the trailer 502. For example, the link arm 516 could be replaced by a piston-and-cylinder unit, and one or both of the piston-and-cylinder units 512, 514 could be replaced by a fixed-length link arm.

The deck 508 can extend over the carriage 510 and partly cover wheels 522 thereof. Access to the wheels 522 can be obtained by raising the deck 508 to a configuration such as that shown in FIG. 18 or FIG. 19.

It is to be understood that while certain forms of the present invention have been illustrated and described herein, it is not to be limited to the specific forms or arrangement of parts described and shown.

What is claimed and desired to be secured by letters patent is as follows:

1. A movable-deck trailer with a normal, forward direction of travel and adapted for releasable attachment to a tow vehicle, which comprises:
   (a) a longitudinal axis extending generally longitudinally parallel with the direction of travel;
   (b) a frame including a pair of longitudinal members extending in spaced, generally parallel relation with respect to said longitudinal axis;
   (c) a deck mounted on said frame;
   (d) a tongue assembly connected to said frame and including means for selective attachment to said tow vehicle;
   (e) a wheeled carriage including a carriage subframe having a pair of walking beams each mounted on a respective side of said carriage and connected to a respective frame longitudinal member by pivotal connection means for providing pivoting of said walking beam with respect to a transverse pivotal axis, each said walking beam having front and back ends;
   (f) front and back axles mounted on said walking beam front and back ends respectively and extending transversely across said trailer; and
   (g) each said axle mounting a pair of wheels and each said axle comprising a torque tube having a pair of trailing arms and stub axles projecting laterally outwardly therefrom and rotatably mounting said wheels.

2. The trailer according to claim 1 wherein each said walking beam includes:
   (a) a pair of axle plates each located on a respective side of a respective longitudinal member; and
   (b) resilient mounting means for resiliently mounting each said axle to said axle plates.

3. The trailer according to claim 2, which includes:
   (a) each said walking beam including two pairs of resilient pads each mounted on a respective axle plate in proximity to the walking beam front and back ends respectively and two pairs of hangers each mounted on a respective resilient pad and connected to a respective torque tube.

4. The trailer according to claim 3, which includes:
   (a) each said walking beam including a respective pair of channel-section members comprising said axle plates and an axle bolt extending therethrough and pivotally connected to a respective frame longitudinal member.

5. The trailer according to claim 2 wherein each said resilient axle mounting means comprises a pad of resilient material connected to a respective walking beam end and an axle hanger connected to said resilient material pad and to a respective axle.

6. The invention according to claim 5, which includes:
   (a) each said axle end being connected to a respective pair of walking beam ends by two pairs of said hangers, each said hanger pair being positioned in generally parallel, spaced relation on each side of a respective longitudinal member.

7. The trailer according to claim 5 wherein:
   (a) each said walking beam includes front and back spacers extending between said axle plates and positioned in proximity to said walking beam front and back ends; and
   (b) each said axle hanger is bolted to a respective spacer by a pair of bolts extending through said spacer, said resilient pad and said axle hanger.

8. The invention of claim 1, which includes:
   (a) means for longitudinally movably mounting said carriage on said frame.

9. The trailer according to claim 8 wherein:
   (a) each said walking beam includes a pair of rollers connected to the front and back ends thereof and rollingly engaging a respective frame longitudinal member.

10. The trailer according to claim 9 wherein each said walking beam includes a pair of axle plates and a pair of roller plates located between said axle plates and rotatably mounting a respective pair of rollers with said respective pair of rollers extending transversely therebetween.

11. The trailer according to claim 10, which includes:
    (a) each said axle plate comprising an angle section with an outwardly-extending flange.

12. The invention of claim 10 wherein each said walking beam includes:
    (a) two pairs of guide bar, each said guide bar pair being mounted on a respective front or back end of a respective walking beam and extending forwardly or rearwardly from a respective roller bar and being fixedly mounted on a respective roller plate, each said guide plate being positioned between a respective frame longitudinal member and a respective roller plate for sliding movement with respect to said longitudinal member.

13. The trailer according to claim 12, which includes:
    (a) a pair of base plates each mounted on the bottom of a respective longitudinal member, each said base plate having a pair of opposite side margins projecting laterally from said longitudinal member; and
    (b) each said base plate side margin being positioned between said box beam rollers and said box beam guide plates of a respective box beam.

14. The trailer according to claim 12, which includes:
    (a) a pair of removable fenders each mounted on a respective side of said trailer bed; and
    (b) each said fender being removably connected to said carriage by a pair of outriggers attached to a respective outboard pair of said guide bars.

15. The trailer according to claim 1, which includes:
(a) each said longitudinal member comprising a hollow box beam with a generally rectangular cross-sectional configuration.

16. The trailer according to claim 1, which includes:
(a) means for longitudinally sliding said carriage comprising a piston-and-cylinder unit with a first end connected to said frame and a second end connected to said carriage, said piston-and-cylinder unit being movable between a retracted position with said carriage in a forward position and an extended configuration with said carriage in a rearward position.

17. The trailer according to claim 16, which includes:
(a) said carriage subframe including a carriage center beam extending generally longitudinally in spaced relation between said walking beams; and
(b) one of said piston-and-cylinder unit ends being connected to said carriage subframe center beam.

18. The trailer according to claim 16, wherein said bed includes:
(a) a front end;
(b) a compartment located at said front end;
(c) a hydraulic pump located in said compartment and selectively connected to said piston-and-cylinder unit; and
(d) hydraulic control means connected to said hydraulic pump for selectively connecting same to said piston-and-cylinder unit.

19. The trailer according to claim 1, wherein:
(a) said tongue assembly includes jack means for raising a front end of said trailer.

20. The trailer according to claim 19, which includes:
(a) said tongue assembly having a front end with said hitch means and a back end having pivotal connection means for pivotal connection to said frame; and
(b) said lack means includes a jack strut pivotally connected to said tongue assembly and movable between an extended position elevating said trailer front end and a retracted position.

21. The trailer according to claim 20, which includes:
(a) said jack strut being pivotally connected to said tongue assembly in spaced relation forward from said tongue assembly back end.

22. The trailer according to claim 21, which includes:
(a) a jack strut piston-and-cylinder unit having a first end connected to said trailer frame and a second end connected to said jack strut front end, said tongue assembly piston-and-cylinder unit being movable between a retracted position with said jack strut retracted and an extended position with said jack strut extended.

23. The trailer according to claim 22, which includes:
(a) a tongue-to-frame lock mounted on said tongue assembly and selectively retaining same in its retracted position; and
(b) a jack strut-to-frame lock selectively retaining said jack strut in its retracted position.

24. The trailer according to claim 1, which includes:
(a) a carriage position lock mounted on said walking beam for retaining same in longitudinally fixed relation on said trailer frame.

25. The trailer according to claim 1, which includes:
(a) brake means associated with said carriage.

26. The trailer according to claim 25 wherein said carriage includes two pairs of wheels and said brake includes a belt attached to said carriage and adapted for engagement by a respective wheel.

27. The trailer according to claim 1, which includes:
(a) wheel immobilizing means comprising a belt selectively engaging and immobilizing a respective wheel and belt mounting means for mounting said belt on said carriage.

28. The trailer according to claim 27 wherein said wheel immobilizing means comprises:
(a) a pair of axle bolts each protruding laterally from a respective walking beam and extending coaxially with said carriage pivotal axis;
(b) a pair of sleeves each selectively receiving a respective extended axle bolt; and
(c) a pair of said belts each mounted on a respective sleeve, each said belt comprising multiple, pivotally interconnected metal links.

29. A movable-deck trailer with a normal, forward direction of travel and adapted for releasable attachment to a tow vehicle, which comprises:
(a) a longitudinal axis extending generally longitudinally parallel with the direction of travel;
(b) a frame including a pair of longitudinal members extending in spaced, generally parallel relation with respect to said longitudinal axis;
(c) a deck mounted on said frame;
(d) a tongue assembly connected to said frame and including hitch means for selective attachment to said tow vehicle; and
(e) a carriage including:
(1) a pair of walking beam assemblies each having an axle plate;
(2) a pair of axle assemblies each pivotally interconnecting a respective longitudinal member and a respective axle plate for pivotal movement therebetween about a transverse pivotal axis;
(3) a pair of torque tube hangers each mounted on a respective axle plate; and
(4) a torque tube axle assembly including a torque tube mounted on said torque tube hangers and extending transversely with respect to said frame, said torque tube assembly having opposite ends each mounting a respective trailing arm, each trailing arm mounting a wheel and each wheel mounting a tire.

30. The trailer according to claim 29, which includes:
(a) each said walking beam assembly including a pair of said axle plates each located on a respective side of a respective longitudinal member; and
(b) each said walking beam including a pair of said axle hangers each connected to a respective axle plate and to said torque tube.

31. The trailer according to claim 30, which includes:
(a) a plurality of resilient shock pads each positioned between a respective axle plate and a respective axle hanger mounted thereon, each said resilient shock pad being mounted by a respective pair of axle hanger bolts extending through a respective axle plate, shock pad and axle hanger.

32. The trailer according to claim 29, which includes:
(a) a pair of said torque tube axle assemblies; and
(b) said carriage pivotal axis being located approximately midway longitudinally between respective rotational axes of said wheels on each side of said trailer.

* * * * *